Patented Apr. 28, 1953

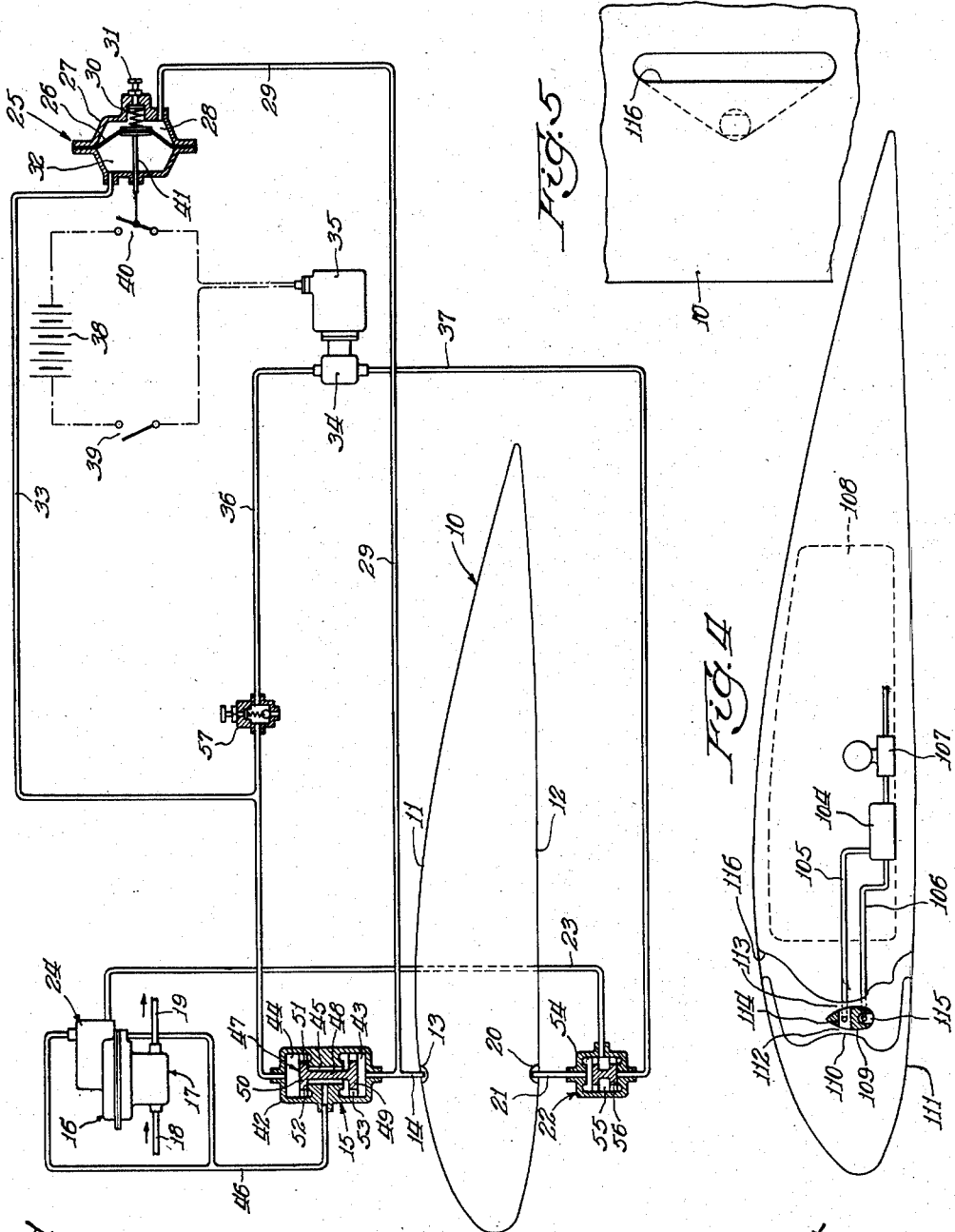

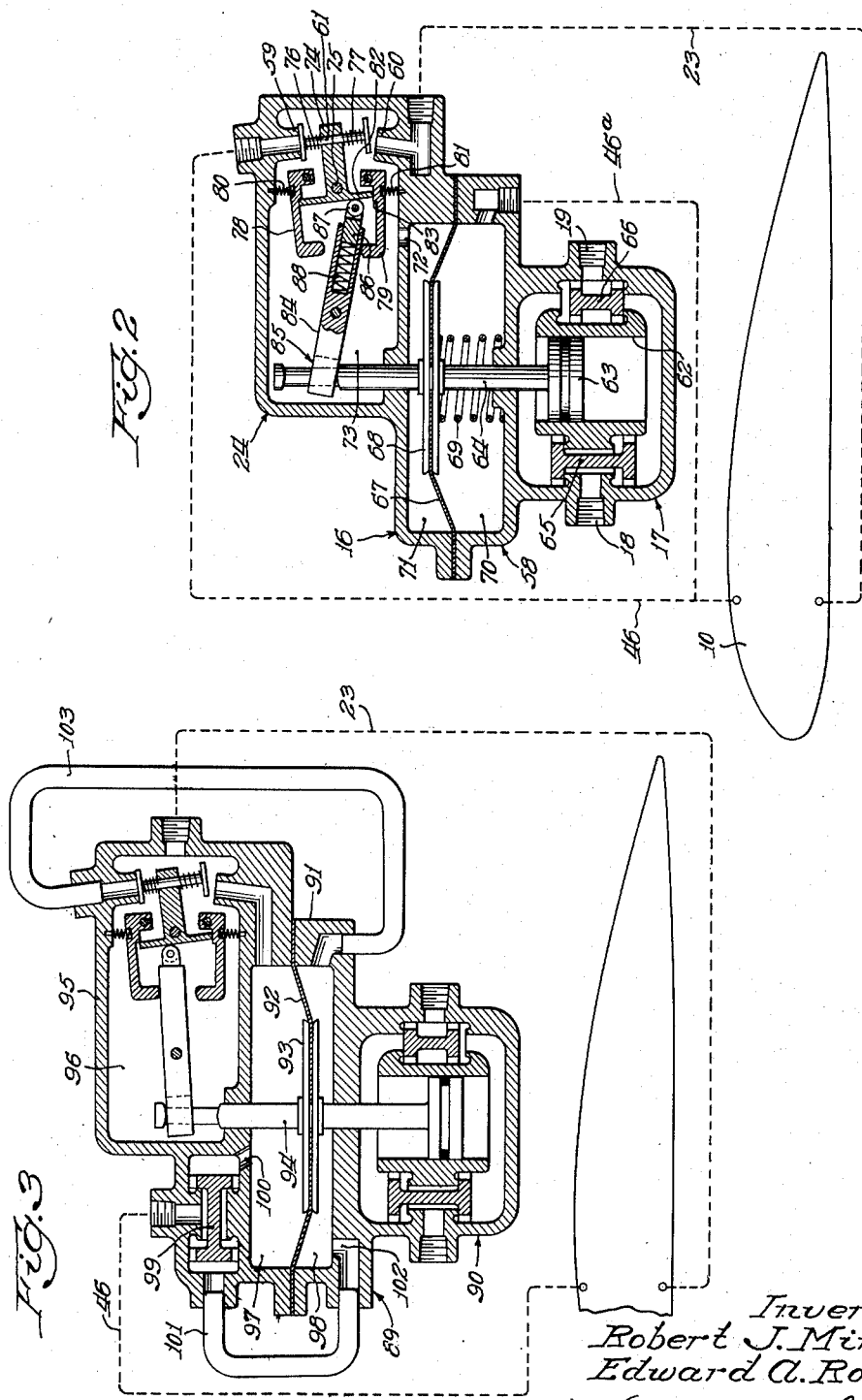

2,636,701

UNITED STATES PATENT OFFICE 2,636,701

PRESSURE DIFFERENTIAL MOTOR AND PUMP

Robert J. Minshall, Shaker Heights, and Edward A. Rockwell, Cleveland, Ohio, assignors, by mesne assignments, to Borg-Warner Corporation, Chicago, Ill., a corporation of Illinois Application August 30, 1943, Serial No. 500,514

13 Claims. (Cl. 244—135)

This invention relates to fluid-type prime movers, and particularly to fluid-type prime movers which are adapted to drive devices associated with fluid supported carriers such as aircraft. For purposes of illustration this invention will be described with reference to a source of power for operating booster fuel pumps on an airplane for pumping fuel from the wing tanks of the airplane.

The principal object of this invention is to provide a prime mover for pumps or the like which utilizes as its source of energy the pressure differential built up between the upper and lower forward surfaces of an airfoil when there is relative movement between the airfoil and the fluid in which it is immersed. Although it is contemplated in the illustrative embodiment of this invention that the airfoil may be fixed to the aircraft, such as a supporting wing or a control surface, it is understood that this invention may also be applied to a rotating airfoil to operate controls or other devices associated therewith.

Another object of this invention is to provide in a fuel pumping system which depends upon a pressure differential produced by an airfoil section, means for accentuating the pressure differential to reduce the size of the pump necessary to move a given quantity of fuel.

A feature of this invention when applied to booster pumps for the main engine pumps of an airplane resides in its ability to produce a varying discharge at constant pressure in the pumps, thus avoiding a re-circulation of excess fuel. A more specific object of this invention thus is to provide a pump which will operate to produce a constant discharge pressure whenever the reaction pressure of the fluid being pumped falls below a predetermined value.

In booster pump constructions of the centrifugal type now commonly in use, a great deal of vapor is produced with a consequent undesirably high fuel loss. A further object of this invention accordingly is to provide a relatively slow speed reciprocating pump unit, the speed of which is controlled automatically by the demand of the engine for fuel.

A more detailed object of this invention is to provide a pressure differential operated motor for driving a pump, with valve means for controlling the operation of the motor; the pump, motor and valve means being arranged in a single housing and coordinated in a manner to make the valve means operate as a function of the pressure head.

A still more specific object of this invention is to provide a simple snap-action valve mechanism for a pressure differential operated motor.

Another object of this invention is to provide a fuel pumping system for aircraft or the like wherein the energy for driving the pump is derived from the flow of air around a wing, with auxiliary pumping means for substituting for the first mentioned pump when the aircraft is not moving through the air.

Other objects include the provision of special valves, controls and arrangements of parts to simplify the construction and reduce the cost of the pumping system.

These and other objects and features of this invention will be described in detail in connection with the accompanying drawings in which:

Fig. 1 is a diagrammatic representation of a fuel pumping system which incorporates this invention;

Fig. 2 is a section through a fuel pump showing the pressure differential motor for operating the pump, a valve control mechanism for the motor and the connections to the sources of pressure differential at the airfoil;

Fig. 3 is a section through a modification of the pressure differential motor and valve control mechanism shown in Fig. 2;

Fig. 4 is a diagrammatic representation of a modification of the fuel pumping system shown in Fig. 1; and Fig. 5 is an enlarged fragmentary view of an orifice and connecting passageway which may be used at the surface of the airfoil.

Referring now to Fig. 1 for a detailed description of the system, 10 is an airfoil section which may be the section of a supporting wing for an airplane. The exact contour of the wing section is not material so long as it produces a difference in pressure between its upper and lower surfaces 11 and 12, respectively, when there is relative movement between the airfoil and the fluid in which it is immersed. In the case of aircraft, the fluid of course will be air, but it is not intended that this invention be limited to air as a medium for producing the difference in pressure. The distribution of pressure along the airfoil 10 will of course vary with the angle of incidence and the shape of the airfoil section, but as ordinarily designed and used, the pressure will be a maximum in a negative sense on the upper surface 11 near the forward (left hand as viewed in Fig. 1) or leading edge of the section and will be a maximum in a positive sense on the lower surface 12 at some point near the leading edge. Thus we have a point of high vacuum and a point of high pressure separated by the airfoil section near its leading edge. It is contemplated that the devices of this invention will utilize these high points of negative and positive pressure insofar as the physical limitations of the airfoil section will permit.

Airfoil section 10 is provided with an opening 13 in its upper surface 11 substantially at the point of highest vacuum, in which is located the open end of a pipe or other conduit 14. Said conduit is connected to a double check valve 15 which in turn is connected to a pressure differential motor 16 of the type shown in Fig. 2 which drives a fuel pump 17 having an inlet passageway 18 coming from a supply tank (not shown) and a discharge passageway 19 leading to either the fuel line of an engine or to another tank. The positive pressure side of airfoil 10 is provided with an opening 20 likewise as near the point of maximum pressure as is conveniently possible in which is inserted the open end of a conduit 21 which is connected to a double check valve 22 and then through a conduit 23 to the control valve section 24 of the pressure differential motor.

Since the pressure differential across the airfoil section exists only when there is relative movement between the airfoil and the air, no motive power is available to operate pressure differential motor 16 when the airfoil is stationary as for example when the airplane is at rest on the ground. It is contemplated by this invention that an auxiliary motor and pump combination, driven by a separate source of power, will be utilized whenever the pressure differential across the airfoil section is insufficient to operate pressure differential motor 16. For this reason a vacuum diaphragm operated switch 25 is provided, the switch having a diaphragm 26 enclosed in a housing 27 and open on one side 28 through a conduit 29 to conduit 14. Thus diaphragm 26 is responsive at all times to the negative pressure existing over the upper forward portion of airfoil section surface 11. A spring 30 acts to counterbalance the negative pressure at all times, a set screw 31 being provided to adjust the tension of the spring. The opposite side 32 of diaphragm 26 is connected by means of a conduit 33 to one side of double check valve 15.

The substitute source of pressure differential is comprised of a pump 34 and a motor 35 for driving pump 34. Said pump 34 may be a vacuum pump or a pressure pump but in any event will have a low pressure side connected by means of a conduit 36 to conduit 33 and double check valve 15, and a high pressure side connected by means of a conduit 37 to the high pressure check valve 22. Motor 35 may be an electric motor which is energized from a battery 38 or other source of electrical energy which in turn is controlled by two switches 39 and 40. Switch 39 is hand-operated and constitutes the master control switch. Switch 40 is connected to diaphragm 26 by means of a rod 41. Thus whenever the pressure in conduit 29 (that is, the vacuum over the upper surface 11 of the airfoil section) decreases below some predetermined value as determined by the setting of spring 30, diaphragm 26 will move to the left as shown in Fig. 1 and will close switch 40. If at that time master switch 39 has been closed, motor 35 will be energized and will drive pump 34, thereby establishing a low pressure in conduit 36 and a high pressure in conduit 37.

Referring now to the double check valves 15 and 22, it will be observed that valve 15 is comprised of a housing 42 having two chambers 43 and 44 therein connected by a cylindrical passageway 45 communicating directly with conduit 46 leading to pressure differential motor 16. A unitary spool type valve 47 controls which of the chambers 43 or 44 shall be in communication with passageway 46. Said spool type valve 47 has a stem 48 which is sufficiently small to permit fluid to pass around it to passageway 45 and two heads 49 and 50 which are similar in construction, each having a central solid section 51 adapted to rest upon a seat 52 in housing 42, and a plurality of arms 53 which center the spool within housing 42. It will be observed that should the pressure in chamber 43 be less than that in chamber 44, spool 47 will assume the position shown thereby shutting off conduit 36 from conduit 46. If, on the other hand, the pressure in chamber 44 is less than that in chamber 43, spool 47 will move upward to close off conduit 14 from conduit 46 and open conduit 36 to said conduit 46.

Double check valve 22 is of somewhat similar construction except that it is adapted to open the highest pressure side to conduit 23. Thus valve 22 is comprised of a housing 54 having a central chamber 55 therein in which is located a spool valve 56. Said spool valve is adapted to shift from a position shown wherein it closes off conduit 37 and opens conduit 21 to conduit 23, to a position wherein conduit 21 is closed off and conduit 37 is connected to conduit 23.

The amount of vacuum or low pressure produced by pump 34 is regulated by snifter valve 57.

The operation of the auxiliary source of motive power is as follows: When the negative pressure in conduit 14 drops below a predetermined value as determined by spring 30 in cutout switch 25, said cut-out switch will close the circuit to motor 35 and the motor will then operate pump 34 to produce a pressure differential in conduits 36 and 37. This will cause valve spools 47 and 56 to assume their upper positions as viewed in Fig. 1, thereby closing off conduits 14 and 21 and connecting conduits 36 and 37 to conduits 46 and 23, respectively. This substitutes the auxiliary pressure differential means for that normally available at the airfoil section 10. If there is no demand for fuel simultaneously with the falling off of the vacuum over the airfoil section, said master switch 39 may be opened to cut out the auxiliary system.

Referring now to Fig. 2 for a detailed description of the motor and control means operated by the difference in pressure across the airfoil section, there is provided a housing 58 which may be divided into the aforementioned pump section 17, differential pressure motor section 16 and control valve section 24.

Pump section 17 is provided with a cylinder 62 in which is adapted to reciprocate a piston 63 having a rod 64 extending through motor section 16 and into control valve section 24. Both ends of cylinder 62 are open and communicate with a low pressure valve 65 which controls the communication between cylinder 62 and the inlet 18 to the pump and a high pressure valve 66 which controls the communication between cylinder 62 and the high pressure or discharge side 19 of the pump. Valve 65 may be identical in construction with check valve 15 and valve 66 may be identical in construction with check valve 22.

In operation, when piston rod 64 is reciprocated so as to reciprocate piston 63 in cylinder 62, an upward movement of piston 63 will result in the building up of pressure in the upper portion of cylinder 62 which pressure is transmitted to valves 65 and 66. Valve 65 will be forced downwardly as viewed in Fig. 2 upon its seat to close off communication between the upper end of cylinder 62 and inlet passageway 18, but will simultaneously open the lower or bottom side of cylinder 62 to inlet passageway 18. Simultaneously with the downward movement of valve 65, high pressure valve 66 will be moved downwardly to close off communication between the bottom end of cylinder 62 with the discharge side 19 of pump 17 and to open the upper end of cylinder 62 to the discharge side. On the downward stroke of piston 63 the positions of valves 65 and 66 are reversed. Pump 17 thus is a double acting pump and is effective to transmit fluid under pressure from inlet side 18 to discharge side 19 on each stroke of piston 63.

Pressure differential motor 16 is comprised of a diaphragm 67, the central portion 68 of which is stiffened to provide a predetermined piston area, and a spring 69 which normally bears against portion 68 to move it upward (Fig. 2). Such diaphragm is connected to piston rod 64 so as to move said rod and its associated piston 63 whenever diaphragm 67 moves. The diaphragm thus divides the motor section 16 into two chambers 70 and 71. The spring chamber 70 communicates through a conduit 46a with conduit 46 and through double check valve 15 (Fig. 1) to the point of high vacuum on airfoil section 10. It is contemplated that spring 69 will not be strong enough to overcome the vacuum or low pressure produced when airfoil section 10 is moving relative to the air. The upper chamber 71 is connected through an opening 72 with the interior 73 of control valve chamber 24.

The control for differential motor 16 is such that chamber 73 is alternately connected to low pressure conduit 46 and high pressure conduit 23, thereby alternately increasing and decreasing the pressure in chamber 71. When the pressure on both sides of diaphragm 67 is the same, spring 69 will control the action of the diaphragm and will move piston 63 upward. When, however, the pressure on the spring side of diaphragm 67 is increased to that obtaining at the underside of the airfoil section, the force of spring 69 will be overcome and the piston 63 will be moved downwardly. The spring side 70 of diaphragm 67 is constantly exposed to the low pressure existing in conduit 46a so as to increase the pressure differential across the two sides of the diaphragm.

The means by which the pressure in chamber 73 is alternately increased and decreased will now be described. Conduit 46 terminates in a valve seat 59 in valve section 24 and conduit 23 terminates in a valve seat 60. Said valve seats are opposed as shown and are adapted to be contacted by a spool valve 61 slidably retained in a rocker arm 74 pivoted at 75 in housing 58. A pair of springs 76 and 77 serve to center valve 61 with respect to arm 74 and also provide a lost motion connection therewith so that said arm 74 may move relative to valve 61. It will be apparent that by oscillating arm 74 about its pivot 75, valve 61 will either seat on valve seat 59 to close off conduit 46 and at the same time open conduit 23 to chamber 73, or will reverse the conditions so that conduit 23 is closed off and conduit 46 is open to chamber 73.

Arm 74 is operated by means of a trip mechanism which is comprised of a pair of pivoted latches 78 and 79 biased by means of springs 80 and 81, respectively, against the end of a cross bar 82 integral with arm 74. Said latches 78 and 79 are provided with stepped portions 83 against which an end of bar 82 normally bears until the latch is tripped. The tripping is accomplished by means of a pivoted lever 84 having a loose tongue-and-groove connection 85 with the upper end of piston rod 64. Lever 84 is hollowed out on its right hand (Fig. 2) end to receive the shank portion 86 of a holder for a roller 87 which contacts the cross bar 82. A spring 88 normally urges roller 87 against cross bar 82.

In operation, assuming all parts to have the position shown in Fig. 2, pressure conduit 23 is in communication with chamber 73 and through opening 72 with the upper side 71 of diaphragm 67. Since the spring side 70 is continuously exposed through conduits 46a and 46 to the vacuum or low pressure side of airfoil section 10, a pressure differential will exist on opposite sides of diaphragm 67 and force the diaphragm and its associated piston rod 64 and piston 63 downward. Near the bottom of the stroke pivoted lever 84 will be rotated counterclockwise about its pivot as viewed in Fig. 2 by means of the loose connection 85 between lever 84 and rod 64. Just as soon as the dead-center position is passed, that is, the position wherein the line of thrust produced by spring 88 upon roller 87 passes slightly above the center of pivot 75, lever 84 will strike the upper latch 78. This will release bar 82 from the stepped portion of its latch and this together with the pressure exerted upon the bar in a clockwise direction by spring 88 and roller 87 will snap rocker bar 74 clockwise, thereby unseating valve 61 from seat 59 and seating it firmly upon the lower seat 60. This immediately closes the pressure side 23 and opens the low pressure or vacuum side 46a to chamber 73. This low pressure will be communicated through opening 72 to the upper chamber 71 and since the low pressure so created will be substantially equal to the low pressure existing in the spring chamber 70, spring 69 will then force rod 64 and its associated piston 63 upward for its return stroke. Near the upper end of the stroke, lever 84 will again be rocked, this time in a clockwise direction as viewed in Fig. 2, releasing latch 79 and snapping lever 74 counterclockwise or upward as viewed in Fig. 2 to open the high pressure side to chamber 73 and close off the low pressure or vacuum side. This reciprocation will continue as long as there is a difference in pressure available in conduits 46 and 23.

It is important to note that the reciprocation of piston 63 can be effected by spring 69 and the difference in pressure on opposite sides of diaphragm 67 only when the resistance to such reciprocation produced by the fluid being pumped is less than the forces available in the spring and diaphragm. Thus should the pressures developed in the discharge line 19 become too great, as for example when the demand for the fluid is less than the amount being pumped, a pressure will be built up which will resist the movement of piston 63 and will eventually become great enough to stop the pump altogether. The net result therefore is to pump fluid into discharge side 19 only as it is required and this obviously avoids the necessity for a bypass in discharge line 19 back to the inlet side 18 to recirculate the excess fluid as is generally done in fluid pumping systems now in use.

In the form of pressure differential motor and control mechanism just described, the pressure on one side of the motor diaphragm was constant while that on the other side varied from a pressure equal to that on the one side to a much higher pressure, a spring being used to move the diaphragm when the pressures on both sides were equal. In the form shown in Fig. 3 the pressures on both sides of the diaphragm vary simultaneously so that when one is low the other is high and vice-versa, thereby making it unnecessary to use a spring to effect the return stroke of the piston.

Referring now to Fig. 3 the housing 89 is again divided into three parts including a pump section 90 which is identical with pump section 17 insofar as the operating parts are concerned, a differential motor section 91 having a diaphragm 92, a stiffened portion 93 and a connection between the diaphragm and a piston rod 94; and a control valve section 95 having valves and a trip mechanism therein which are identical with those shown in Fig. 2. The high pressure conduit 23, however, is connected to valve chamber 96 at all times and the valves serve merely to transfer the pressure from the upper chamber 97 of diaphragm 92 to the lower chamber 98. The low pressure line 46 is not directly connected to lower chamber 98, but is controlled by a valve 99 identical in construction with valve 47 (Fig. 1) to the upper chamber 97 through an opening 100 in motor chamber 91 and then to the lower chamber 98 by means of a conduit 101 and an opening 102.

In operation, the form shown in Fig. 3 admits fluid under pressure from conduit 23 through the valve section 95 to the upper chamber 97 and also through opening 100 to the right hand side (Fig. 3) of valve 99, thereby closing off that side from communication with conduit 46 and opening the left hand side to low pressure. The lower chamber 98 is closed with reference to high pressure line 23 through the upper valve in valve section 95 and conduit 103. The difference in pressure on the two sides of diaphragm 92 thus produced will cause the piston rod 94 to descend and near the end of its motion trip the valve mechanism in valve chamber 96 so that the pressure line 23 is connected through the valve section 95 and conduit 103 to the lower chamber 98 and also through opening 102 and conduit 101 to the left hand side of valve 99. This causes valve 99 to move to the right as viewed in Fig. 3, thereby exposing opening 100 to the low pressure line 46 and through said opening 100 exposing the upper chamber 97 to low pressure likewise. Said upper chamber 97 will have been closed with respect to the high pressure line 23 by the valve mechanism in control valve section 95 and hence a pressure differential is again created across the diaphragm 92, this time the high pressure side being on the bottom and the low pressure side on the top. This will cause piston rod 94 to move upward for its return stroke. The reciprocation of rod 94 and its associated pump mechanism continues as long as there is a pressure differential available in conduits 23 and 46. As in the form shown in Fig. 2 the reciprocation of rod 94 is possible only if the resistance to such reciprocation is less than the available pressure differential across diaphragm 92. Thus the feature of pumping only as much fluid as is required without recirculation of the fluid is retained in the form shown in Fig. 3.

To avoid the use of excessively long conduits the pressure differential motor and pump mechanism may be installed in or near the wing tank itself. Such an arrangement is shown in Fig. 4 wherein the pressure differential motor and pump are shown diagrammatically at 104 connected to a low pressure conduit 105 leading to the low pressure side of the airfoil section and to a conduit 106 leading through means hereinafter described to the high pressure side of the section. An accumulator and storage tank shown diagrammatically at 107 may be connected to the outlet of pump 104 to reduce pulsations in the flow of the fuel. The outlines of the fuel tank are shown dotted at 108 and it is understood that the pump and pressure differential motor and valve section may be either within the tank 108 as shown, or in proximity thereto. If immersed in the tank then the auxiliary electric motor such as shown at 35 in Fig. 1 and associated pump and controls must be located outside the tank to eliminate fire hazards.

The difference in pressure between the upper and lower sections of the airfoil section may be accentuated, if desired, by means of a venturi arranged between the low and high pressure points on airfoil 111 and connected to the conduits 105 and 106, respectively. Such a venturi is shown in Fig. 4 and comprises a strut 109 inserted in a construction 110 in a slot passing from the upper surface to the lower surface of the airfoil section and having a cross-sectional area between the strut 109 and its respective upper and lower opening which is constant and larger than that at 110. Strut 109 is preferably a streamlined section with the widest portion facing downward toward the high pressure side of the airfoil section 111. The insertion of strut 109 in the constricted opening 110 forms two venturi 112 and 113 both of which are connected by means of a horizontal conduit 114 which in turn forms the terminus of low pressure conduit 105. The downwardly extending end of strut 109 has an opening 115 in which high pressure conduit 106 terminates.

The actual shape of the opening at the surfaces of the airfoil section 111 is shown in Fig. 5 and may comprise a longitudinal slot 116 the cross-sectional area of which is substantially equal to that of any section of the slot except that at the constricted portion 110.

The operation of the form shown in Figs. 4 and 5 is believed to be apparent from the drawings and the above description. It will be observed that this form requires the shortest conduits and hence is less susceptible to break down than the one shown in Fig. 1.

It is understood that the means for accentuating the difference in pressure between the upper and lower surfaces of an airfoil section shown in Fig. 4 may be applied also to the system shown in Fig. 1 regardless of which pressure differential motor is used. It is likewise understood that the motors and associated mechanism shown in Figs. 2 and 3 are interchangeable and may be used as desired in conjunction with the remainder of the systems shown in Figs. 1 and 4. It is also contemplated that the auxiliary motor and pump shown in Fig. 1 may be omitted either entirely, or if desired, the motor and pump may be retained and the automatically operated vacuum control switch may be eliminated, all in the discretion of the designer.

We claim:

1. In combination, a fluid operated motor, means for establishing different pressures in the fluid for operating the motor, said means comprising a body immersed in the fluid and having substantially an airfoil section adapted to establish different pressures along its surface when there is relative movement between the body and fluid, said body having a slot having one terminus substantially at the point of highest pressure along the surface and its other terminus located substantially at the point of lowest pressure along said surface, means in said slot adapted to establish a venturi to accentuate the difference in pressure between the highest and lowest pressures established along the body, and means for communicating the accentuated difference in pressure to the motor, said means for establishing a venturi comprising a strut having an airfoil section interposed in the slot to form two constricted passageways, said strut having an opening substantially parallel to said constricted opening and at the high pressure side thereof, and an opening connecting the two constricted passageways at the narrowest points thereof.

2. A fuel pumping system for a power-driven aircraft having a supporting wing, a fuel tank in said wing, a pump for removing fuel from the tank, a pressure differential operated motor for driving the pump, said motor and pump being located in proximity to the tank and within the wing section, means for communicating the pressure differential established between the upper and lower forward surfaces of the wing when said wing is moved through the air to said motor for operating the motor, and means in the communicating means for accentuating the pressure differential established between the highest and lowest pressure points on the wing surface whereby to reduce the size of the motor for a given power output requirement.

3. A fuel pumping system for aircraft comprising a tank for the fuel, a pump for withdrawing fuel from the tank, a supporting structure for the aircraft having an airfoil section so as to produce differences in pressure along the surfaces thereof as the structure is moved through the air, a motor for driving the pump, said motor deriving its energy from the pressure differential established on the surfaces of the supporting structure and having means for communicating the pressure differential from the airfoil section to the motor, and auxiliary means for operating the motor when the pressure differential along the supporting structure surfaces is insufficient to operate the motor.

4. A pumping system as described in claim 3, and automatically operated valve means for rendering the pressures established on the surfaces of the structure ineffective to operate the motor when the auxiliary means is operative.

5. A pumping system as described in claim 3, and automatic means controlled by the pressure established at the surface of the supporting structure for cutting in the auxiliary means.

6. A system as described in claim 3, automatically operable valve means for excluding the pressures established over the supporting structure from the motor when the auxiliary means is operative, and automatic means responsive to the pressure established at the supporting structure for cutting in the auxiliary means when the pressures over the supporting structure are insufficient to operate the motor.

7. In combination, a supporting structure for an aircraft, the structure having an airfoil section such that when it is moved through the air differences in pressure will be established over the surfaces of the structure, a pressure differential motor for driving an accessory of the aircraft, means for communicating the differences in pressure established along the surfaces of the supporting structure to the pressure differential motor, auxiliary means for establishing different pressures for operating the motor when the supporting structure is not moving through the air, said auxiliary means comprising a pump for creating differences in pressure in the communicating means, an electric motor for driving the pump, a source of electrical energy connected to the motor, a manually operated switch for controlling the electrical energy, a second switch in series with the manually operated switch, and pressure differential means for operating the second switch, said pressure differential means being responsive to the pressures established at the surface of the supporting structure.

8. An arrangement on an aircraft for pumping fuel from the tank to a point remote therefrom, said arrangement comprising a member on the aircraft having an airfoil section that is effective to produce differences in pressure at spaced points on the surface thereof when the aircraft is in flight; and means for pumping fuel from the tank comprising means defining a plurality of chambers; a pump in one of said chambers; valve means in another one of said chambers; and pressure differential operated motor means in a third chamber; control means for said valve means actuated by said motor; and conduits communicating the aforesaid differences in pressure on said member to said valve means and said motor for effecting the withdrawal of fuel from the tank.

9. An arrangement on an aircraft for pumping fuel from the tank to a point remote therefrom, said arrangement comprising a member on the aircraft having an airfoil section that is effective to produce differences in pressure at spaced points on the surface thereof when the aircraft is in flight; and means for pumping fuel from the tank comprising a housing; partitions in said housng defining a pluralty of chambers; a pressure differential operated motor in one chamber; control valves for said motor in another chamber, a rod passing through the motor chamber and into said valve chamber, said rod being common to said valves and motor; snap-action control means for said valves, said control means being actuated by said rod; and conduits communicating the aforesaid differences in pressure on said member to the chambers containing said valves and said motor for effecting the operation of fuel pumping means connected with said motor.

10. An arrangement on an aircraft for pumping fuel from the tank to a point remote therefrom, said arrangement comprising a member on the aircraft having an airfoil section that is effective to produce differences in pressure at spaced points on the surface thereof when the aircraft is in flight; a motor chamber; a diaphragm dividing said motor chamber into two compartments; a reciprocable rod connected to said diaphragm and operating through opposite walls of said motor chamber for operating the fuel pump; yieldable means constantly urging said diaphragm in one of two directions; and means for alternately balancing and unbalancing the pressure in the two compartments of the motor chamber, said last-mentioned means including fluid circuits communicating the aforesaid differences in pressure on said airfoil member to said motor chamber whereby the movement of said diaphragm by said spring effects one of the strokes for driving said reciprocable rod, and the unbalanced pressure in said fluid circuits will move the diaphragm in the opposite direction to effect the return stroke of said rod.

11. An arrangement as defined in claim 10 wherein the balancing and unbalancing means include control valves for the motor chamber, and snap-action means actuated by the rod for operating the control valves.

12. In a motor arrangement forming part of an aircraft and adapted to drive the fuel pump for moving liquid fuel from the tank to a point remote therefrom; said arrangement including airfoil defining means effective to produce a differential pressure between spaced points about the surface thereof when the associated aircraft is in flight; motive means operable in response to said differential pressure, said motive means comprising a reciprocable diaphragm; valve means for controlling the delivery of said differential pressure to said motor diaphragm, said valve means comprising a pair of opposed ports, a first one of said ports being in communication with a first one of said spaced points and the other one of said ports being in communication with a second one of said spaced points, whereby to deliver differential pressures to said ports, said valve arrangement further including a double acting pair of valves cooperating with said respective ports; and means for connecting said valves with said reciprocable diaphragm for alternately delivering differential pressure first to one side of said diaphragm and then to the other side thereof for operating said motor.

13. In a motor arrangement forming part of an aircraft fuel feed system adapted for moving liquid fuel from the tank to a point remote therefrom, said arrangement including airfoil defining means effective to produce a differential pressure at spaced points about the surface thereof when the associated aircraft is in flight; a reciprocable diaphragm operable in response to said differential pressure; first and second opposed ports for controlling the delivery of said differential pressure to said diaphragm, said first port being in communication with a first one of the spaced points on said airfoil defining means and the second port being in communication with a second one of said spaced points, whereby to deliver differential pressures to said ports; a double acting pair of valves alternately seated on said respective ports for delivering differential pressure first to one side of said diaphragm and then to the other side thereof; means actuated by said diaphragm for operating said valves; and a double acting reciprocable pump connected with and actuated by said diaphragm.

ROBERT J. MINSHALL.
EDWARD A. ROCKWELL.

References Cited in the file of this patent

UNITED STATES PATENTS

| Number | Name | Date |
|---|---|---|
| 1,018,400 | White | Feb. 20, 1912 |
| 1,283,524 | Jay | Nov. 5, 1918 |
| 1,351,538 | Reynolds | Aug. 31, 1920 |
| 1,878,723 | Stalker | Sept. 20, 1932 |
| 2,266,585 | Bouvy | Dec. 16, 1941 |
| 2,301,916 | Horton et al. | Nov. 17, 1942 |
| 2,321,423 | Rogers | June 8, 1943 |

FOREIGN PATENTS

| Number | Country | Date |
|---|---|---|
| 6,483 of 1913 | Great Britain | Apr. 15, 1914 |